United States Patent [19]
Jamison

[11] 3,868,745
[45] Mar. 4, 1975

[54] WHEELED CART
[76] Inventor: John P. Jamison, Rt. 1, Box 315, Mooresboro, N.C. 28114
[22] Filed: Apr. 8, 1974
[21] Appl. No.: 458,815

[52] U.S. Cl. .................................................. 16/41
[51] Int. Cl. ............................................ B60b 33/00
[58] Field of Search ................................. 16/41, 18

[56] References Cited
UNITED STATES PATENTS
1,153,838  9/1915  Bower et al. ............................ 16/41
3,801,129  4/1974  Kotzin ..................................... 16/41

Primary Examiner—Paul R. Gilliam
Assistant Examiner—Doris L. Troutman
Attorney, Agent, or Firm—Browdy and Neimark

[57] ABSTRACT

A caster assembly is disclosed for use in conjunction with a caster for an industrial truck or the like where lint, string, or other unwanted materials are apt to be picked up by the caster or wheel and become secured or embedded therearound so as to impede caster operation. The non-binding caster comprises a yoke; an axle extending within the yoke; a hubcap fixedly attached to the yoke intermediate the yoke and the wheel for deflecting the foreign material away from the wheel and the axle; and a plurality of blades mounted between the hubcap and the yoke for cutting the foreign material deflected by the hubcap. Metal shields mounted above the blades may be employed as a safety device to cover the blades and, thereby eliminate the possibility of workers being cut by the blades.

9 Claims, 2 Drawing Figures

PATENTED MAR 4 1975

3,868,745

WHEELED CART

FIELD OF THE INVENTION

The present invention relates to a caster for use on a dolly or wagon in an arrangement when the caster is likely to pick up lint or the like and, more particularly, to such a device for use in a textile mill which device is non-binding.

BACKGROUND OF THE INVENTION

Conventional casters, when used in textile mills and other places where fibers and yarns are found on floors, tend when rolled along the floors to be jammed by the fibers or yarns which become wrapped around the axles or wheels of the casters. For example, carts or other industrial trucks which are used in textile mills and supported on casters have been frequently rendered inoperative as a result of binding and locking caused by wrapping of foreign fiber or yarn around the axles by the rotation of the castor wheels.

Prior art devices have attempted to obviate this difficulty, encountered primarily in textile mills, by the provision of a shield adjacent the inner surface of the caster wheel, the shield being for the purpose of preventing the lint or yarn, when wound around the shaft of the caster, from interferring from the rotation of the wheel. When a large amount of yarn has been collected on the caster shaft, the truck must usually be taken out of service and the caster wheel removed from its shaft before the yarn may be removed from the caster. In some instances, the yarn must be manually cut from the shaft without removing the wheel.

A primary disadvantage of such devices is that they do not eliminate the likelihood of the yarn being wrapped around the wheel axle in the first place. In an effort to overcome this disadvantage, it has been proposed to contact the caster or wheel with rigid metal scraper blades, flexible scraper blades, and various brush arrangements; or to completely enclose the caster assembly except for the portion of the caster in contact with the floor. However, the utility of many of these devices has been completely negated due to the difficulty encountered in cleaning the casters even though on a less frequent cycle. This difficulty of cleaning has stemmed from the apparatus holding the scrapers, brushes and the like which is not conveniently removable or manipulable to provide access to the caster for cleaning.

SUMMARY OF THE INVENTION

Accordingly, it is an object of the present invention to overcome the defects of the prior art, such as indicated above.

Another object of the present invention is to provide an improved self-cleaning, non-binding caster for an industrial truck or the like.

Another object is to provide a caster which will limit the amount of yarn picked up on the wheel retained by the caster.

A further object of the present invention is to provide a caster in which if yarn is picked up by the wheel, there is little likelihood of the yarn being wrapped around the body or otherwise retained on the body of the caster.

Yet another object of the present invention is to provide a caster in which if any large mass of foreign material is picked up by the wheel, it will be cut off during rotation of the wheel.

Still another object is to provide a caster in which the shaft or the caster is protected from the collection of yarn and lint.

A yet further object is to provide a caster which is inexpensive to manufacture, durable in structure, efficient in operation, and easy to clean.

In furtherance of these and other objects, a principal feature of the caster of the instant invention is the provision of cutting blades mounted between a stationary hubcup and the yoke or frame of the caster. Another feature is that four blades are utilized, two on each side of the wheel. Although these blades are capable of cutting the yarn or other foreign material as it collects on the wheel, a further feature is that the wheel itself is designed such that there is little or no accumulation of yarn thereon. Yet another feature is that the wheel is countersunk to receive the hubcap members which deflect foreign material and yarn away from the wheel and the axle. Thus, the shortcomings of prior art casters are satisfactorily overcome by the present invention.

The non-binding caster of the present invention is characterized by having a yoke; an axle extending through the yoke; a wheel carried by the axle within the yoke; a hubcap fixedly attached to the yoke intermediate the yoke and the wheel for deflecting foreign material or yarn away from the wheel and the axle; and a plurality of blades mounted between the hubcap and the yoke for cutting the foreign material deflected by the hubcap. Metal shields mounted above the blades may be employed as a safety device to cover the blades and, thereby eliminate the possibility of the workers being cut by the blades.

For a better understanding of the invention, a possible embodiment thereof will now be described with reference to the attached drawing, it being understood that this embodiment is intended to be merely exemplary and in no way limitative.

DETAILED DESCRIPTION OF THE DRAWING

Figure 1:
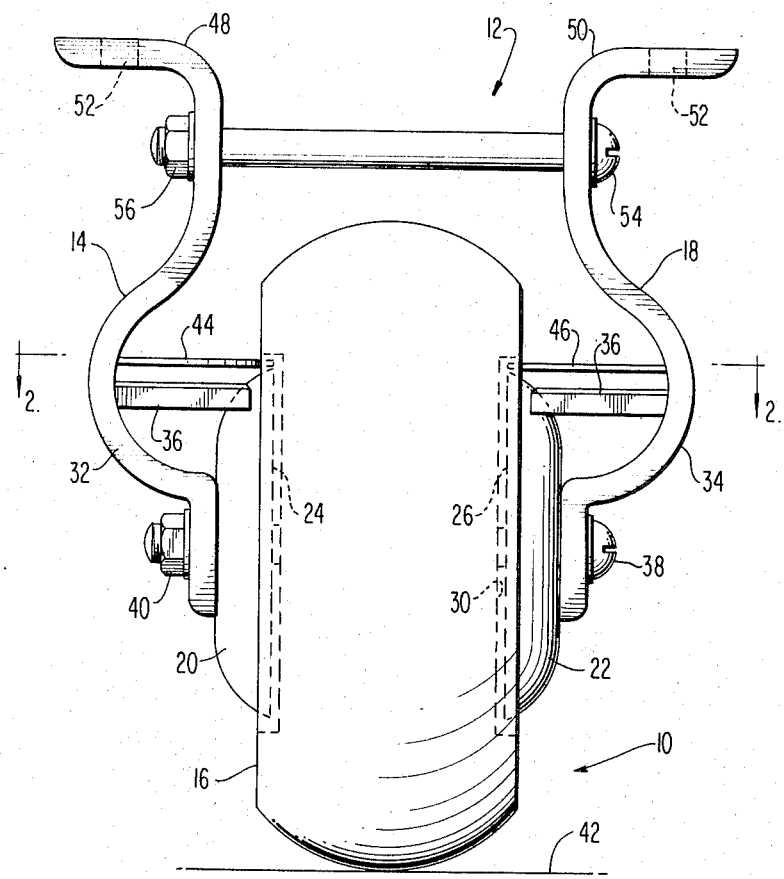
FIG. 1 is a front elevation view of one embodiment of the caster of the instant invention.
Figure 2:
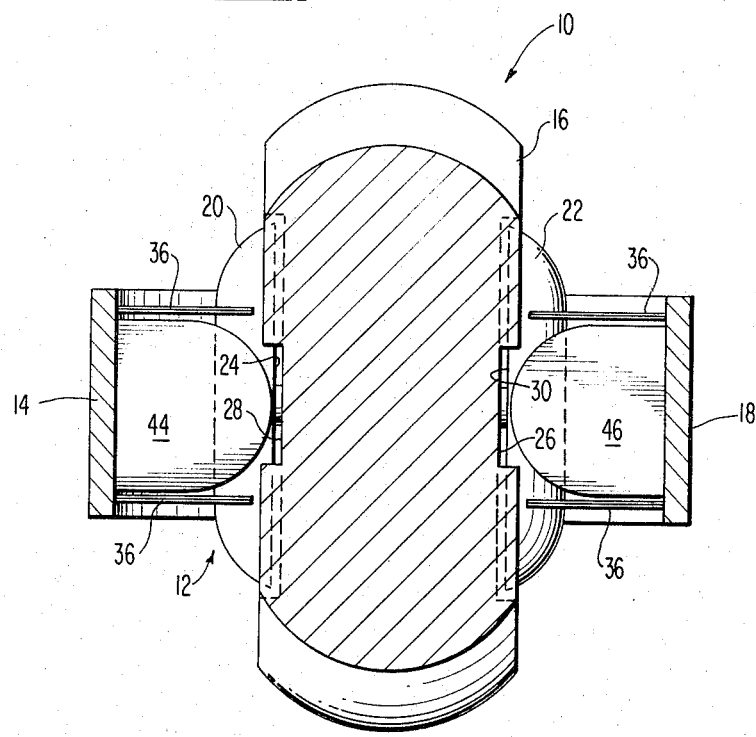
FIG. 2 is a cross-sectional view of the caster taken along line 2—2 of FIG. 1.

Referring to FIGS. 1 and 2, there is shown a caster 10 having a yoke assembly 12 which includes a first bracket member 14 located on one side of wheel 16 and a second bracket member 18 located on the other side of wheel 16. A pair of hemispherical hubcaps 20 and 22 having curved outer surfaces are fixedly attached to the brackets 14 and 18 respectively, intermediate the brackets and the wheel 16. These hubcaps 20 and 22 have substantially flat surfaces 24 and 26, respectively, which extend into a pair of countersunk portions 28 and 30, respectively, of wheel 16. The wheel 16 is rotatably mounted between the hubcaps 20 and 22 on a bolt-like axle 38 which is secured to the yoke assembly 12 by a nut 40. For highest efficiency, the wheel 16 should be as wide as possible and the hubcaps 20 and 22 should be of a diameter which is substantially equal to that of the wheel 16.

The brackets 14 and 18 include bowed portions 32 and 34, respectively, which extend axially outward from the wheel 16. A plurality of blades 36 are removeably or replaceably mounted between the hubcaps 20 and 22 and the inner surfaces of the bowedout portions 32 and 34 of brackets 14 and 18, respectively. Ideally, two blades separated by a distance approximately one-half the diameter of the wheel are located on either side of the wheel 16 (See FIG. 2). Because the single-edged or double-edged blades 36 are mounted vertically with at least one of their edges facing away from the floor 42, plate-like shields 44 and 46 may be mounted above the blades 36 between the hubcaps 20 and 22 and the brackets 14 and 18, respectively. The width of the metal shields 44 and 46 is slightly smaller than the distance between the blades 36 located on the same side of the wheel 16 (see FIG. 2). This design permits access of yarn and other foreign material to the blades 36, but sufficiently covers the blades to eliminate the possibility of workers being cut thereby. Also, utilization of four blades (two spaced apart blades on each side of the wheel) provides improved cutting when used in conjunction with a wheel which rotates clockwise or counterclockwise.

The brackets 14 and 18 include, at their upper ends, flange type connecting members 48 and 50, respectively. The connecting members 48 and 50 may either be both turned outward, away from the wheel 16, or one may be turned outward and the other turned inward. The flanges 48 and 50 include apertures 52 which are capable of receiving fastening members for mounting the caster assembly 10 to the bottom of an industrial truck or other similar factory vehicle. To facilitate the easy disassembly of the caster assembly 10, the brackets 14 and 18 are connected at their upper end by means of a bolt 54 which is securely held in place by a screwed on nut 56. Thus, by simply removing bolt 54 and axle 38, the caster assembly 10 may be disassembled and the wheel 16 removed.

In operation, as the caster assembly 10 travels along the floor 42 of a textile mill or other factory, the yarn or fibrous material picked up due to the rotation of the wheel 16 is deflected away from the wheel 16 and the axle 38 by means of the hubcap members 20 and 22 reversed within the counters and portions 28 and 30 of the wheel 16. The curved outer surfaces of hubcaps 20 and 22 cause any collected yarn to be deflected or transported to the blades 36. Further rotation of the wheel 16 causes such yarn or other fibrous material to be wrapped about the yoke assembly 12 and/or the blades 36. The increased pressure created by the further wrapping of the yarn about the blades 36 causes the blades to cut the yarn. After the yarn is cut away from the wheel, it falls to the floor where it may be easily swept up by the usual janitorial services.

If the wheel 16 does become jammed, it may be freed through any easy cleaning operation. Firstly, the bolt 54 and axle 36 are removed. Next, either bracket 14 or 18 is disconnected from the bottom of the industrial truck. The disconnected bracket is then slid away from the wheel 16, thereby freeing the wheel 16 for removal from the caster assembly 10. After the cleaning operation, the process may be reversed and the caster assembly 10 quickly reassembled and reconnected to the industrial truck or the like. It should be noted that disassembly for lubricating purposes is substantially lessened if the axle 38 is provided with a lubrication channel which communicates with an external opening (not shown) in the axle 38 to form an external lubrication means.

The device may be formed of conventional materials, e.g. either metal or plastic, e.g. nylon, Teflon or Debrin. Particularly if the bearing surfaces are formed of nylon or Teflon, the need for lubrication is minimized.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment. Further, it is to be understood that the phraseology or terminology employed herein is for the purpose of description and not of limitation.

What is claimed is:

1. An industrial truck caster having an increased tendency to be free from binding by foreign material which may be picked up and wrapped thereabout as the caster rolls along a floor, comprising:

an axle;

a wheel rotatably mounted about said axle;

a yoke, said yoke including a first bracket having a central portion bowed outward away from said wheel, a first flange portion including an aperture for receiving one end of said axle, and a second flange portion attached to the other end of said bowed central portion including means for attaching said first bracket to the industrial truck, said yoke also including a second bracket substantially parallel to said first bracket having a central portion bowed away from said wheel, a first flange portion connected to one end of said bowed central portion for receiving the other end of said axle, and a second flange portion attached to the other end of said bowed central portion including means for attaching said second bracket to the industrial truck;

fastening means for connecting said second flange portion of said first bracket to said second flange portion of said second bracket without interferring with the rotation of said wheel; and cutting means mounted between said wheel and said bowed portions of said first and second brackets for cutting the foreign material picked up by the caster.

2. The caster of claim 1 further comprising shield means mounted between said wheel and said yoke for substantially covering said cutting means while permitting access of the foreign material thereto, whereby the possibility of industrial truck operators being cut by said cutting means is reduced.

3. The caster of claim 1 wherein said wheel is countersunk.

4. The caster of claim 1 wherein a hubcap having a curved outer surface is connected to said wheel and said yoke, said curved outer surface being fixedly attached to said yoke.

5. The caster of claim 1 wherein said cutting means is a replaceable single-edged blade.

6. The caster of claim 1 wherein said cutting means is a replaceable double-edged blade.

7. The caster of claim 2 wherein said shield means is a metal plate.

8. The caster of claim 5 wherein said blade is mounted substantially perpendicular to the floor with a cutting edge facing away from the floor.

9. The caster of claim 1 wherein said cutting means is a plurality of blades mounted in pairs on both sides of said wheel, the distance between said blades of each of said pairs being approximately equal to one-half the diameter of said wheels.

* * * * *